US010499259B2

(12) United States Patent
Tapia et al.

(10) Patent No.: US 10,499,259 B2
(45) Date of Patent: Dec. 3, 2019

(54) SPECIAL EVENTS MODULE FOR SELF-ORGANIZING NETWORKS

(71) Applicant: T-Mobile USA, Inc., Bellevue, WA (US)

(72) Inventors: Pablo Tapia, Snoqualmie, WA (US); Amarnath Vishvanath Algundgi, Woodinville, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/278,271

(22) Filed: May 15, 2014

(65) Prior Publication Data

US 2014/0247750 A1 Sep. 4, 2014

Related U.S. Application Data

(63) Continuation-in-part of application No. 13/831,082, filed on Mar. 14, 2013, now Pat. No. 10,243,794.

(Continued)

(51) Int. Cl.
*H04W 24/02* (2009.01)
*H04W 84/18* (2009.01)
*H04L 12/24* (2006.01)

(52) U.S. Cl.
CPC .......... *H04W 24/02* (2013.01); *H04L 41/082* (2013.01); *H04W 84/18* (2013.01)

(58) Field of Classification Search
CPC ..... H04B 7/0408; H04B 7/0413; H04L 41/20; H04L 41/082; H04L 41/0816;

(Continued)

(56) References Cited

U.S. PATENT DOCUMENTS

2002/0158897 A1 10/2002 Besaw et al.
2005/0007993 A1* 1/2005 Chambers ............... H04L 12/66
                                                            370/349

(Continued)

FOREIGN PATENT DOCUMENTS

CN         103227995        7/2013
EP         2403290 A1       1/2012

(Continued)

OTHER PUBLICATIONS

Yilmaz, O.; Hamalainen, S.; Hamalainen, J., "Analysis of Antenna Parameter Optimization Space for 3GPP LTE," Vehicular Technology Conference Fall (VTC 2009—Fall), 2009 IEEE 70th, vol., No., pp. 1,5, Sep. 20-23, 2009 doi: 10.1109/VETECF.2009.5379077.*

(Continued)

*Primary Examiner* — Nicholas R Taylor
*Assistant Examiner* — Michael Li
(74) *Attorney, Agent, or Firm* — Lee & Hayes, P.C.

(57) ABSTRACT

Described herein are one or more self-organizing network (SON) tools configured to receive indicia that an event affecting usage of telecommunication service will occur at a specific location and at a specific time. Based at least in part on information about the event, the one or more SON tools determine one or more configuration changes to apply to telecommunication infrastructure. The one or more SON tools then apply the one or more configuration changes to the telecommunication infrastructure at the specific location and at the specific time.

15 Claims, 6 Drawing Sheets

Related U.S. Application Data (60) Provisional application No. 61/695,212, filed on Aug. 30, 2012.

(58) Field of Classification Search
CPC . H04L 41/0886; H04L 43/10; H04L 43/0811; H04L 41/147; H04L 41/0806; H04L 47/823; H04L 67/26; H04L 67/32; H04L 41/022; H04L 41/069; H04L 41/0896; H04L 43/12; H04L 63/20; H04L 63/104; H04L 41/085; H04L 41/0233; H04L 41/0823; H04L 41/5054; H04L 41/5058; H04L 12/66; H04L 47/14; H04L 12/1417; H04L 12/1435; H04L 41/044; H04W 24/02; H04W 24/08; H04W 24/10; H04W 84/18; H04W 24/00; H04W 4/021; H04W 4/206; H04W 8/06; H04W 12/06; H04W 12/08; H04W 88/10; H04W 88/16; H04W 88/00; H04W 88/085; H04W 4/24; H04W 88/18; Y02B 60/50; G06F 9/5072; G06F 9/45558; G06F 21/00; G06Q 30/016; G06Q 10/10; G06Q 30/02; H04M 15/66; H04M 15/852; H04M 15/8038
See application file for complete search history.

(56) References Cited

U.S. PATENT DOCUMENTS

| | | | |
|---|---|---|---|
| 2005/0165906 A1* | 7/2005 | Deo | H04L 41/5054 709/217 |
| 2008/0139197 A1* | 6/2008 | Misra | H04L 43/12 455/423 |
| 2008/0155087 A1 | 6/2008 | Blouin et al. | |
| 2009/0006010 A1 | 1/2009 | Van Sloun et al. | |
| 2009/0216881 A1 | 8/2009 | Lovy et al. | |
| 2009/0257353 A1* | 10/2009 | Song | H04W 24/02 370/241 |
| 2010/0009694 A1 | 1/2010 | Fischer | |
| 2010/0016034 A1 | 1/2010 | Lindqvist et al. | |
| 2010/0020699 A1 | 1/2010 | On | |
| 2010/0100758 A1 | 4/2010 | Houmaidi | |
| 2010/0150150 A1 | 6/2010 | Paz et al. | |
| 2010/0299419 A1 | 11/2010 | Ramankutty et al. | |
| 2010/0325267 A1* | 12/2010 | Mishra | H04L 41/069 709/224 |
| 2011/0009105 A1* | 1/2011 | Lee | H01Q 9/0407 455/418 |
| 2011/0010751 A1 | 1/2011 | Soulhi | |
| 2011/0053587 A1 | 3/2011 | Turk et al. | |
| 2011/0083138 A1 | 4/2011 | Sivasubramanian et al. | |
| 2011/0171952 A1 | 7/2011 | Niu | |
| 2011/0261721 A1 | 10/2011 | Zhou et al. | |
| 2011/0265011 A1 | 10/2011 | Taylor et al. | |
| 2011/0286337 A1 | 11/2011 | Olsson | |
| 2011/0289142 A1* | 11/2011 | Whalin | G06Q 10/10 709/203 |
| 2011/0300871 A1 | 12/2011 | Dottling et al. | |
| 2012/0039175 A1 | 2/2012 | Sridhar et al. | |
| 2012/0059923 A1* | 3/2012 | Cleary | H04W 24/00 709/223 |
| 2012/0079066 A1* | 3/2012 | Li | H04L 67/26 709/217 |
| 2012/0101952 A1* | 4/2012 | Raleigh | G06Q 30/016 705/304 |
| 2012/0108232 A1 | 5/2012 | Viering et al. | |
| 2012/0144038 A1* | 6/2012 | Hildebrand | H04L 41/0806 709/226 |
| 2012/0146799 A1 | 6/2012 | Bell et al. | |
| 2012/0166008 A1 | 6/2012 | Jeong | |
| 2012/0170478 A1 | 7/2012 | Doettling et al. | |
| 2012/0179822 A1* | 7/2012 | Grigsby | G06F 9/5072 709/226 |
| 2012/0213057 A1* | 8/2012 | Zhang | H04W 24/02 370/216 |
| 2012/0307697 A1 | 12/2012 | Mukhopadhyay | |
| 2012/0320766 A1 | 12/2012 | Sridhar | |
| 2013/0104173 A1 | 4/2013 | Tjio et al. | |
| 2013/0189941 A1* | 7/2013 | Abbott | H04W 4/021 455/404.1 |
| 2013/0242720 A1 | 9/2013 | Chou | |
| 2013/0257623 A1 | 10/2013 | Bagasra | |
| 2013/0288681 A1 | 10/2013 | Hamalainen et al. | |
| 2013/0294286 A1 | 11/2013 | Schmelz et al. | |
| 2013/0305322 A1* | 11/2013 | Raleigh | G06Q 30/016 726/4 |
| 2014/0031006 A1 | 1/2014 | Moore et al. | |
| 2014/0040450 A1 | 2/2014 | Sanneck et al. | |
| 2014/0068034 A1 | 3/2014 | Tapia | |
| 2014/0086073 A1 | 3/2014 | Baykal et al. | |
| 2014/0229210 A1 | 8/2014 | Sharifian et al. | |
| 2014/0250201 A1 | 9/2014 | Tapia | |
| 2014/0331277 A1* | 11/2014 | Frascadore | H04L 63/20 726/1 |
| 2014/0355439 A1 | 12/2014 | Kakadia | |
| 2014/0355484 A1 | 12/2014 | Foster et al. | |
| 2015/0023209 A1 | 1/2015 | Gunnarsson et al. | |
| 2015/0026327 A1 | 1/2015 | Tang et al. | |
| 2015/0043386 A1* | 2/2015 | Racz | H04L 41/044 370/255 |
| 2015/0050925 A1 | 2/2015 | Tapia | |
| 2015/0146675 A1 | 5/2015 | Zhang et al. | |

FOREIGN PATENT DOCUMENTS

| | | |
|---|---|---|
| KR | 1020100047170 | 11/2011 |
| WO | WO2010132884 A1 | 1/2010 |
| WO | WO2013124435 | 8/2013 |
| WO | WO2013136813 | 9/2013 |
| WO | WO2014003770 | 1/2014 |
| WO | WO2014023347 | 2/2014 |

OTHER PUBLICATIONS

Panisson, et al., "Designing the Architecture of P2P-Based Network Management Systems", Proceedings of the 11th IEEE Symposium on Computers and Communications, Jun. 2006, 7 pgs.
PCT Search Report and Written Opinion dated Dec. 2, 2013 for PCT application No. PCT/US13/57170, 10 pages.
Tirado, et al., "Affinity P2P: A self-organizing content-based locality-aware collaborative peer-to-peer network", Computer Networks 54, Jun. 1, 2010, pp. 2056-2070.
Movehedi, et al., "A Survey of Autonomic Network Architentures and Evaluation Criteria", IEEE Communications Surveys & Tutorials, vol. 14, No. 2, May 2012, pp. 464-490.
Nascimento, et al., "Virtual routers as a service: the RouteFlow approach leveraging software-defined networks", Proceedings of the 6th International Conference on Future Internet Technologies, Jun. 2011, pp. 34-37.
Office Action for U.S. Appl. No. 13/831,082, dated Apr. 6, 2015, Pablo Tapia, "Open Architecture for Self-Organizing Networks", 16 pages.
Final Office action for U.S. Appl. No. 13/831,082, dated Oct. 8, 2015, Tapia, "Open Architecture for Self-Organizing Networks", 17 pages.
Non-Final Office action for U.S. Appl. No. 14/496,185, dated Oct. 8, 2015, Inventor #1, "Self-Organizing Network Mechanism for Energy Saving During an Outage", 14 pages.
Office action for U.S. Appl. No. 14/277,389, dated Aug. 7, 2015, Li, "Network Support Node Traffic Reduction for Self-Organizing Networks", 15 pages.
PCT Search Report and Written Opinion dated Aug. 10, 2015 for PCT application No. PCT/US2015/029518, 11 pages.
Office action for U.S. Appl. No. 13/831,082, dated Jul. 27, 2016, Tapia, "Open Architecture for Self-Organizing Networks", 24 pages.
Office action for U.S. Appl. No. 14/277,389, dated Jul. 28, 2016, Tapia, "Network Support Node Traffic Reduction for Self-Organizing Networks", 17 pages.

(56) References Cited

OTHER PUBLICATIONS

PCT Search Report and Written Opinion dated Jun. 29, 2016 for PCT application No. PCT/US2016/015184, 12 pages.
Office action for U.S. Appl. No. 14/277,389, dated Dec. 11, 2015, Tapia, "Network Support Node Traffic Reduction for Self-Organizing Networks", 16 pages.
Office action for U.S. Appl. No. 14/496,185, dated Apr. 20, 2016, Tapia, "Self-Organizing Network Mechanism for Energy Saving During an Outage", 17 pages.
Extended European Search Report dated Apr. 6, 2016 for European patent application No. 13833979.1, 9 pages.
PCT Search Report and Written Opinion dated Mar. 18, 2016 for PCT Application No. PCT/US2015/050740, 12 pages.
Scully, et al., "Measurements, Architecture and Interfaces for Self-Organizing Networks", Internet Citation, Oct. 31, 2010, pp. 1-47, retrieved from the internet at URL:http://www.fp7-socrates.eu/files/Deliverables/SOCRATES_D5.10%20Measurements,%20architecture%20and%20interfaces%20for%20self-organising%20networks.pdf, retrieved on Mar. 1, 2011.
Office Action for U.S. Appl. No. 14/612,962, dated Sep. 16, 2016, Zhang et al., "Performance-Based ptimization of QoS Factors", 17 pages.
Office Action for U.S. Appl. No. 14/496,185, dated Nov. 4, 2016, Pablo Tapia, "Self-Organizing Network Mechanism for Energy Saving During an Outage", 23 pages.
Chinese Office Action dated Sep. 5, 2016 for Chinese Patent Application No. 201380043793.9, a counterpart foreign application of U.S. Appl. No. 13/831,082, 34 pgs.
Office action for U.S. Appl. No. 13/831,082, dated Jan. 13, 2017, Tapia, "Open Architecture for Self-Organizing Networks", 22 pages.
Office action for U.S. Appl. No. 14/277,389, dated Jan. 26, 2017, Tapia, "Network Support Node Traffic Reduction for Self-Organizing Networks", 17 pages.
Translated Chinese Office Action dated May 12, 2017 for Chinese patent application No. 201380043793.9, a counterpart foreign application of U.S. Appl. No. 13/831,082, 31 pages.
Office Action for U.S. Appl. No. 14/612,962, dated Apr. 20, 2017, Zhang et al., "Performance-Based Optimization of QoS Factors", 16 pages.
Office action for U.S. Appl. No. 14/496,185, dated Jun. 1, 2017, Tapia, "Self-Organizing Network Mechanism for Energy Saving During an Outage", 26 pages.
Chinese Office Action dated Dec. 7, 2017 for Chinese patent application No. 201380043793.9, a counterpart foreign application of U.S. Appl. No. 13/831,082.
Extended European Search Report dated Jan. 18, 2018 for European patent application No. 15844457.0, 12 pages.
Office Action for U.S. Appl. No. 14/612,962, dated Sep. 1, 2017, Ting Zhang, "Performance-Based Optimization of QoS Factors", 19 pages.
Office action for U.S. Appl. No. 14/496,185, dated Dec. 21, 2017, Tapia, "Self-Organizing Network Mechanism for Energy Saving During an Outage", 19 pages.
Office action for U.S. Appl. No. 14/277,389, dated Dec. 28, 2017, Tapia, "Network Support Node Traffic Reduction for Self-Organizing Networks", 23 pages.
Office Action for U.S. Appl. No. 14/612,962, dated Mar. 20, 2018, Ting Zhang, "Performance-Based Optimization of QoS Factors", 25 pages.
European Office Action dated May 24, 2018 for European Patent Application No. 13833979.1, a aounterpart foreign application of U.S. Appl. No. 13/831,082, 9 pages.
European Office Action dated Aug. 6, 2018 for European Patent Application No. 15844457.0, a counterpart foreign application of U.S. Appl. No. 14/496,185, 4 pages.
Extended European Search Report dated Jun. 15, 2018 for European patent application No. 16747001.2, 9 pages.
Office Action for U.S. Appl. No. 14/496,185, dated Jun. 25, 2018, Tapia, "Self-Organizing Network Mechanism for Energy Saving During an Outage", 22 pages.
Ilyoung Chong HUFS Korea (Republic of), "The output draft Supplement document of Y.son-ngn;TD891 (NGN-GSI)", ITU-T draft; study period 2009-2012, International Telecommunication Union, Geneva, CH, VO. 24/13, Feb. 16, 2012, pp. 1-32.
Office Action for U.S. Appl. No. 14/612,962, dated Oct. 5, 2018, Zhang et al, "Performance-Based Optimization of QoS Factors", 18 pages.
Office Action for U.S. Appl. No. 14/496,185, dated Feb. 7, 2019, Tapia, "Self-Organizing Network Mechanism for Energy Saving During an Outage", 19 pages.
Chinese Office Action dated Sep. 5, 2019 for Chinese Patent Application No. 201580051438.5, a counterpart of U.S. Appl. No. 14/496,185, 8 pages.
European Office Action dated Apr. 10, 2019 for European Patent Application No. 15844457.0, a counterpart of U.S. Appl. No. 14/496,185, 5 pages.
Office Action for U.S. Appl. No. 14/496,185, dated Apr. 19, 2019, Tapia, "Self-Organizing Network Mechanism for Energy Saving During an Outage", 23 pages.
Office Action for U.S. Appl. No. 14/612,962, dated May 3, 2019, Zhang, "Performance-Based Optimization of QoS Factors", 18 pages.

* cited by examiner

SPECIAL EVENTS MODULE FOR SELF-ORGANIZING NETWORKS

RELATED APPLICATIONS

This patent application is a continuation-in-part of U.S. Non-provisional patent application Ser. No. 13/831,082, filed on Mar. 14, 2013, which claims priority filing benefit from U.S. Provisional Patent Application No. 61/695,212, filed Aug. 30, 2012. Application Ser. No. 13/831,082 and 61/695,212 are hereby incorporated by reference, in their entirety.

BACKGROUND

Self-Organizing Networks (SON) are networks capable of any or all of automatic self-configuration, self-optimization, or self-healing. Recent developments of SON have centered on radio access networks, but any sort of network may be developed into an SON, such as a smart energy grid system or a medical health system. For radio access networks, such as telecommunication networks, self-configuration may include use of "plug-and-play" techniques for automatically configuring and integrating new base stations into the networks. Self-optimization includes automatic adjustments of base station parameters based on performance indicators. Self-healing may also involve automatic adjustments of base station parameters. For instance, a neighboring base station may be automatically re-configured to support users of a failed base station.

Tools have been developed for radio access networks implementing SON technologies. Such tools may include performance management tools, radio frequency (RF) planning tools, automatic frequency planning tools, rehoming tools, or automatic cell planning tools. Each of these tools is entirely self-contained and handles everything from interfacing directly with network components to retrieve measurements and configure parameters, to smart analysis of and decisions regarding measurements and configurations, to presentation of users of relevant information. Because each tool is self-contained while performing many of the same tasks, there is a great amount of redundancy across the tools, and a heightened burden on tool developers, thereby hindering adoption of SON.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, an API for SONs that is common to at least a plurality of SON tools of a specific SON. The API enables multiple SON components to each focus on a purpose (e.g., data consolidation, visualization, etc.) while communicating with each other to accomplish an overall SON plan. Thus, one component may gather network information and determine performance indicators and another may receive updated network configurations and configure network components, and a SON tool may receive performance indicators and provide updated network configurations to those components using the API or perform at least one action based on the performance indicators. The SON tool may also or instead be triggered by another SON component and perform an action, such as restoring a parameter to a specific value following a parameter consistency check, without respect to the performance indictors.

Additionally, the API may be extended by new SON tools, and the SON may include a SON automation engine to receive the new SON tools, to integrate the new SON tools into the SON, and to execute the new SON tools. The SON automation engine may handle a range of tasks for SON tools, significantly reducing the amount of development required for a given SON tool. In some embodiments, the SON automation engine may receive specification of SON tools from developers through, for example, a SON portal.

The disclosure further describes one or more self-organizing network (SON) tools configured to receive indicia that an event affecting usage of telecommunication service will occur at a specific location and at a specific time. The one or more SON tools may, as described herein, comprise a special events module. Based at least in part on information about the event, the one or more SON tools determine one or more configuration changes to apply to telecommunication infrastructure. The one or more SON tools then apply the one or more configuration changes to the telecommunication infrastructure at the specific location and at the specific time.

In some embodiments, the indicia may be received from one or more web feeds, such as Rich Site Summary (RSS) feeds, or from a web crawler. In other or additional embodiments, the indicia may be the same as the information about the event, and both may refer to historical usage patterns associated with the specific location.

In further embodiments, determining the configuration changes may comprise applying one or more thresholds or models to the information about the event and selecting the configuration changes based on associations of those configuration changes with the thresholds or models. Also or instead, determining the configuration changes may include selecting a configuration change template from a plurality of configuration change templates based at least in part on information about the event. The determined configuration changes may include of shutting down a cell site, turning on a cell site, adjusting power, adjusting a cell parameter (e.g., load balance threshold, maximum bit rate), adjusting a tilt of an antenna at a cell site, or reconfiguring handovers between connection types supported by a cell site.

In various embodiments, the one or more self-organizing network (SON) tools may further notify an application server of the configuration changes to the telecommunication infrastructure to enable the application server to manage user devices within a wireless connection range of the telecommunication infrastructure.

Overview

Figure 1:
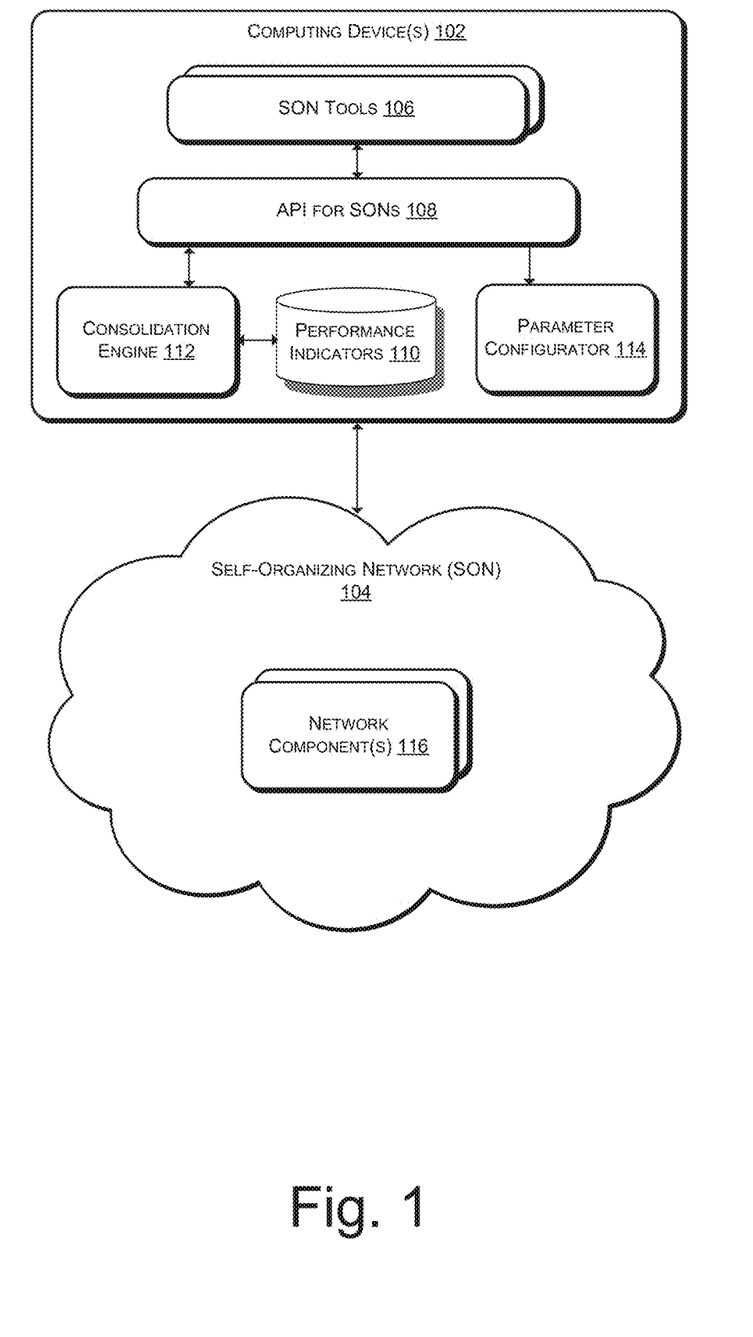
FIG. 1 illustrates an overview of a SON with an application programming interface (API) common to a plurality of SON tools, the SON tools receiving performance indicators via the API and performing at least one action based on the performance indicators.

FIG. 1 illustrates an overview of a SON with an application programming interface (API) common to a plurality of SON tools, the SON tools receiving performance indicators via the API and performing at least one action based on the performance indicators. As illustrated, one or more computing devices 102 associated with a SON 104 may be configured with SON tools 106 that utilize an API for SONs 108 which is common to the multiple SON tools 106. The SON tools 106 receive performance indicators 110 associated with network information via the API 108, the performance indicators 110 having been determined by a consolidation engine 112. The SON tools 106 perform at least one action based on the performance indicators 110, such as generating updated network configurations based on the performance indicators 110 and providing the updated network configurations via the API 108 to a parameter configurator 114. The parameter configurator 114 then configures one or more network components 116 of the SON 104 by, for example, updating parameters of the network component(s) 116.

Figure 3:
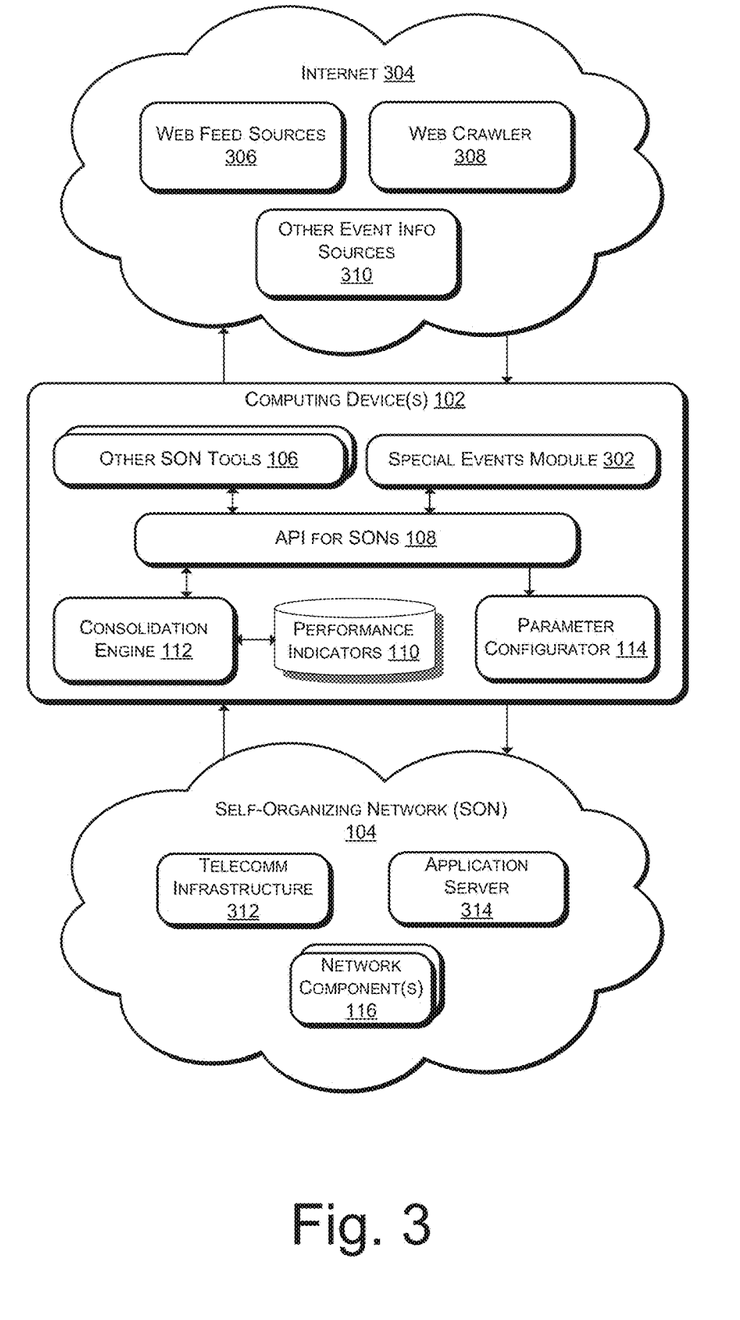
FIG. 3 illustrates a further example environment including a SON telecommunication network and a special events module, which may represent one or more SON tools, configured to receive indicia of events from the Internet or from historical usage patterns and to reconfigure telecommunication infrastructure of the SON telecommunication network based at least in part on information about the events.

In various embodiments, the computing device(s) 102 may each be or include a server or server farm, multiple, distributed server farms, a mainframe, a work station, a personal computer (PC), a laptop computer, a tablet computer, an embedded system, or any other sort of device or devices. In one implementation, the computing device(s) 102 represent a plurality of computing devices working in communication, such as a cloud computing network of nodes. The computing device(s) 102 may belong to the SON 104 or may be external to but in communication with the SON 104. An example computing device 102 is illustrated in FIG. 3 and is described in detail below with reference to that figure.

The SON 104 may be any sort of network configured by SON components to perform at least one of self-configuring, self-optimizing, or self-healing. Such SON components are illustrated in FIG. 1 by elements 106-114. For example, the SON 104 may be a radio access network, such as a telecommunication network, a smart energy grid network, or a medical health network. The network component(s) 116 of the SON 104 may be subnetworks, devices, or modules capable of being initialized or configured by the SON components 106-114. For example, when the SON 104 is a telecommunication network, such as a 2G, 3G, or 4G/LTE network, the network component(s) 116 may be base stations (e.g., Node Bs or eNode Bs), radio network controllers (RNCs), an operations support system (OSS), a word order system, or other network element(s). Information about the SON 104 (referred to herein as "network information"), such as measurements or parameters, may also be provided by the network component(s) 116, or may instead be provided by other sources within the SON 104. For example, the network information may be provided by any or all of a trouble ticket system, radio traces, core network traces, from an OSS, or from one or more other network elements. Depending on the purpose(s) of the SON 104 (e.g., telecommunications, energy, medical health), the SON 104 may include any number of different subnetworks, devices, and modules specific to the purpose(s) of the SON 104 and may be in communication with any number of devices external to the SON 104.

In some embodiments, the consolidation engine 112 may be a SON component whose purpose to receive or retrieve network information and to determine performance indicators 110 based on that network information. The consolidation engine 112 may have ongoing, periodic, or event-driven connections to sources of network information of the SON 104, and the consolidation engine 112 receives or retrieves the network information via those connections.

Upon receiving the network information, the consolidation engine 112 utilizes a store of performance indicators 110, such as key performance indicators, associated with the API 108 to determine new/updated performance indicators 110. The store of performance indicators 110 may be any sort of database, file, or data structure. Also, the store of performance indicators 110 may be associated with a schema, and the schema may be extended, along with the API 108, in response to the addition of new SON tools 106. Based on the schema, the stored performance indicators 110, and the received or retrieved network information, the consolidation engine 112 determines new/updated performance indicators 110 and stores those new/updated performance indicators 110 in the store of performance indicators 110. New performance indicators 110 may be generated by the consolidation engine 112 responsive to a request to generate a performance indicator 110 that was received by the consolidation engine 112 from a SON tool 106. In some embodiments, this may involve filtering out redundant or non-utilized network information.

The consolidation engine 112 may then automatically provide the determined performance indicators 110 to one or more of the SON tools 106 by utilizing the API 108 to invoke the one or more SON tools 106. The SON tools 106 invoked may be a function of which performance indicators 110 have been added or updated. In other embodiments, rather than automatically invoking SON tools 106, the consolidation engine 112 may be queried for performance indicators 110 by the SON tools 106 via the API 108.

In various embodiments, the API 108 is an API for SONs that may be standardized and shared among multiple SONs. When standardized, the API 108 may expose at least one of standardized methods/procedures or standardized parameters, such as performance indicators 110. In other embodiments, the architecture utilizing the API 108 may be standardized among multiple SONs, but the API 108 may be specific to the SON 104, including methods/procedures and parameters/performance indicators 110 that are specific to the SON tools 106. For example, an SON tool 106 may have a method to invoke that SON tool 106 to generate an updated network configuration, and the method may be associated with specific performance indicators 110 that are to be provided when calling the method. Such a method may be part of the API 108. Likewise, the consolidation engine 112 may provide a query method for retrieving performance indicators 110, the query method having as parameters the identifiers of the performance indicators 110 being sought by the query. Such a query method may also be part of the API 108. In addition, the API 108 may include methods for providing data to or for receiving or retrieving data from any of the SON components 106-114. In some embodiments, the API 108 may include methods for alerts or alarms that may be utilized by the SON tools 106 to receive notifications that, for example, a performance indicator 110 exceeds a threshold. Also, while the API 108 is illustrated as a separate SON component, it is to be understood that the methods/processes associated with the API 108 are methods/processes of the other SON components 106 and 110-114 and that API 108 may simply be a logical representation, not a separate module of code or hardware device.

In some embodiments, the SON tools 106 may each be responsible for performing some task associated with self-configuration, self-optimization, or self-healing of the SON 104 resulting, for example, in the generation of an updated network configuration by that SON tool 106. The SON tools 106 may also each invoke, via the API 108, a SON component to perform an action based on the performance indicators 110, invoke, via the API 108, an engineering tool based on the performance indicators 110, pass, via the API 108, information associated with the performance indicators 110 to a SON component, sending, via the API 108, a notification associated with the performance indicators 110, or generate of a report based on the performance indicators 110.

The updated network configuration may simply be an update to a single parameter of a single network component 116 or may represent a more comprehensive configuration of multiple parameters of multiple network components 116. A SON tool 106 may be invoked by the consolidation engine 112 and receive performance indicators 110 or may invoke a query method of the API 108 associated with the consolidation engine 112 to receive or retrieve performance indicators 110. A SON tool 106 may also be invoked by another SON tool 106 through the API 108, and those SON tools 106 may collaborate.

Using the performance indicators 110, the SON tool 106 may generate an updated network configuration and invoke a method of the API 108 associated with the parameter configurator 114 to provide the parameter configurator with the updated network configuration. For example, the SON tool 106 may be a rehoming tool and may receive a performance indicator 110 which notifies the SON tool 106 that an RNC has been added for a geographic area. In response, the SON tool 106 may generate an updated network configuration which reassigns a number of base stations that are currently associated with one RNC to the new RNC.

Examples of SON tools 106 may include any or all of an automated report generating tool, a parameter consistency check tool, a real-time alert tool, a mobility evaluation tool, a coverage and interference management tool, a network outage tool, a network configuration tool, a load distribution tool, a spectrum carving tool, or a special events tool. Additionally or instead, the SON tools 106 may include any or all of a performance management tool, a radio frequency (RF) planning tool, an automatic frequency planning tool, a rehoming tool, an automatic cell planning tool, or a geolocation tool.

In some embodiments, SON tools 106 may perform actions without respect to performance indicators 110. The SON tools 106 may be triggered by other SON components and may perform an action, such as resetting a parameter, without needing to receive or retrieve performance indicators 110.

In various embodiments, the parameter configurator 114 may be invoked by a SON tool 106 and provided, via the API 108, with an updated network configuration. Alternatively, the parameter configurator 114 may invoke a SON tool 106 to retrieve an already prepared, updated network configuration or to have the SON tool 106 generate and provide an updated network configuration. Upon retrieving or receiving the updated network configuration, the parameter configurator 114 configures one or more network components 116 with the updated network configuration. As mentioned above, this may involve adjusting one or more parameters or network component(s) 116. Example network component(s) 116 are described above in further detail.

Example Environment

Figure 2:
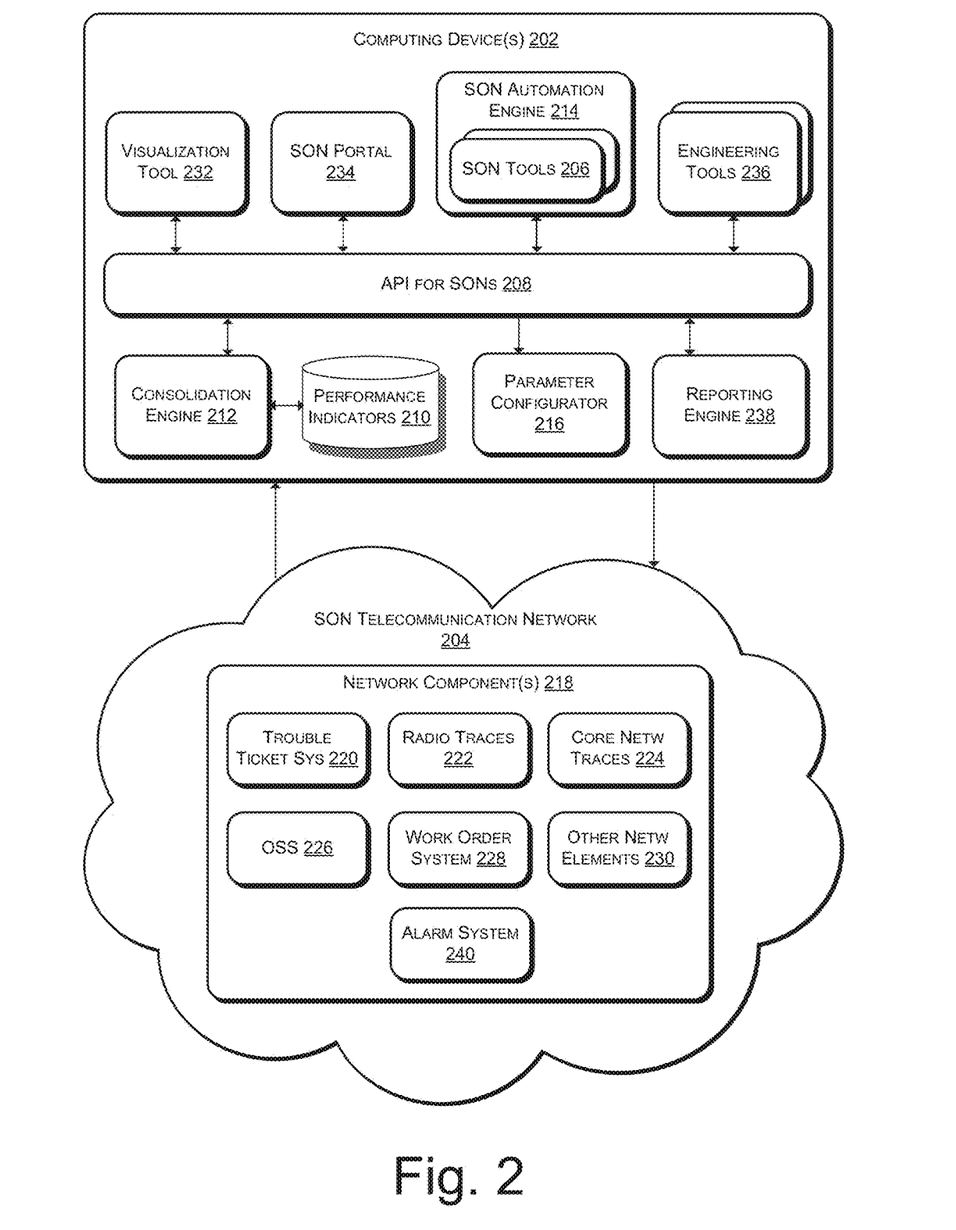
FIG. 2 illustrates an example environment including multiple SON components for a telecommunication network, the multiple SON components sharing a common API and each performing some aspect of planning, configuring, managing, optimizing, or healing the telecommunication network in an automated fashion. The API enables further SON components to be added or modified.

FIG. 2 illustrates an example environment including multiple SON components for a telecommunication network, the multiple SON components sharing a common API and each performing some aspect of planning, configuring, managing, optimizing, or healing the telecommunication network in an automated fashion. The API enables further SON components to be added or modified. As illustrated, one or more computing devices 202 associated with a SON telecommunication network 204 may be configured with SON tools 206 that utilize an API for SONs 208 which is common to the multiple SON tools 206. The SON tools 206 receive performance indicators 210 associated with network information via the API 208, the performance indicators 210 having been determined by a consolidation engine 212. A SON automation engine 214 executes the SON tools 106, causing the SON tools 106 to perform an action based on the performance indicators 210, such as generating updated network configurations based on the performance indicators 210 and provide the updated network configurations via the API 208 to a parameter configurator 216. The parameter configurator 216 then configures one or more network components 216 of the SON telecommunication network 204 by, for example, updating parameters of the network component(s) 218. Example network component(s) 218 may include a trouble ticket system 220, radio traces 222, core network traces 224, an OSS 226, a work order system 228, one or more other network elements 230, or an alarm system 240.

In addition, the SON components illustrated in FIG. 2 include a visualization tool 232 to generate visualizations based on the performance indicators 210, a SON portal 234 to display the visualizations, to enable user collaboration regarding the SON telecommunication network 204, and to enable developer specification of SON tools 206, engineering tools 236, and a reporting engine 238. The engineering tools 236 may be invoked by SON tools 206 to participate in self-configuring, self-optimizing, or self-healing the SON telecommunication network 204. The visualization tool 232, SON portal 234, and engineering tools 236 may communicate with each other and with other SON components via the API 208.

The computing device(s) 202 may be similar to or the same as computing device(s) 102. Likewise, SON telecommunication network 204 may be similar to or the same as SON 104, with the difference that SON telecommunication network 204 is specifically identified as a telecommunication network. Network component(s) 218 may also be similar to or the same as network component(s) 116, except that specific network component(s) 220-230 are illustrated and identified in FIG. 2. Those network component(s) 218—a trouble ticket system 220, radio traces 222, core network traces 224, an OSS 226, a work order system 228, one or more other network elements 230, and alarm system 240—are also mentioned above with respect to network component(s) 116 as examples of network component(s) 116 that may be associated with SON 104 when SON 104 is a telecommunication network. These network component(s) 218 and other sources of network information may provide network information to the consolidation engine 212 and receive updated network configurations from the parameter configurator 216.

In some embodiments, the SON tools 206, API 208, performance indicators 210, consolidation engine 212, and parameter configurator 216 may be similar to or the same as SON tools 106, API 108, performance indicators 110, consolidation engine 112, and parameter configurator 114, and what is written above with respect to these SON components 106-114 may also apply to SON components 206-212 and 216, except as distinguished in describing FIG. 2.

In various embodiments, the visualization tool 232 may be invoked by or may query the consolidation engine 212 via the API 208, and the visualization tool 232 may receive performance indicators 210 as a result of the invoking or querying. The visualization tool 232 may receive the performance indicators 210 periodically or on an event-driven basis as a result, for example, of performance indicators meeting a threshold or model specified by a rule of the visualization tool 232 or the consolidation engine. For instance, the visualization tool 232 may have a rule specifying that the visualization tool 232 is to receive notification if a performance indicator 210 exceeds a certain threshold, and the consolidation engine 212 may expose, via the API 208, an alert or alarm method that the visualization tool 232 may register for. In such an instance, responsive to registration by the visualization tool 232, the visualization tool 232 may be invoked to receive an alert or alarm when the performance indicator 210 exceeds the threshold.

In some embodiments, the visualization tool 232 generates visualizations based on the performance indicators 210, alerts, or alarms. These visualizations may graphically convey information about the SON telecommunication network 204 and may be displayed to a user. In order to provide the visualizations to users, the visualization tool 232 may provide the visualizations to the SON portal 234, which may display the visualizations, or may provide them to another device for display, such as a server or an end user device. The SON portal 234 or device that the visualization is shared with may be a function of configuration of the visualization tool 232.

Also, in further embodiments, the visualization tool 232 may invoke the SON automation engine 214 or a particular SON tool 206 executed by that SON automation engine 214 based on rules or user input. Such rules may direct the visualization tool 232 to invoke the SON automation engine 214 or SON tool 206 when a performance indicator 210 meets a threshold or model or when an alert or alarm is received. User input, received in response to providing a visualization, may also cause the visualization tool 232 to invoke the SON automation engine 214 or SON tool 206.

In various embodiments, the SON portal 234 may be a user-facing component for displaying information, enabling collaboration of users, and enabling specification by users of SON tools 206. The SON portal 234 may receive, via the API, visualizations from the visualization tool 232 and may provide those visualization to a user device through, for example, web page. The SON portal 234 may also receive other network information or performance indicators 210 via the API 208 from any of the SON components, such as the consolidation engine 212 or the visualization engine 232. The SON portal 234 may also receive user input in return and may provide that user input to a SON tool 206 or to the visualization engine 232 to utilize in performing an action or in further visualizations.

The SON portal 234 may also include a collaboration engine or other social network component which enables users to communicate about the SON telecommunication network 204, including discussing problems with the SON plan implemented by the SON telecommunication network 204 and suggestions for improving that plan. In some embodiments, the SON portal 234 may even enable users to vote on a number of suggested improvements to the SON plan, and the improvement with the highest plurality of votes may be implemented by developers associated with the SON telecommunication network 204 specifying a new SON tool 206.

In further embodiments, the SON portal 234 enables specification of SON tools 206. The SON portal 234 may offer a user interface for textual or graphical specification of a new SON tool 206. Such a user interface may simply accept textually-specified code for a SON tool 206, or may even allow a user to select graphical representations of SON components (e.g., a graphical representation of the consolidation engine 212) to cause automatic specification of code for accessing the SON component through the API 208. Also, the SON portal 234 may automatically specify or update SON tools 206 based on user comments. For example, a SON tool 206 may have a threshold at which user devices are reassigned to different access networks to avoid congestion. If there are sufficient complaints of congestion, the SON portal 234 may update that threshold to better avoid congestion.

In various embodiments, the SON automation engine 214 may execute any one or more of the SON tools 206 in response to being invoked through the API 208 or in response to the SON tool 206 being invoked, receiving an alarm or alert, etc. The SON automation engine 214 may handle a number of execution-related functions for SON tools 206, such as memory allocation and release, calls to system components, etc. Also, the SON automation engine 214 may receive specifications of SON tools 206 from the SON portal 234, compile those specifications if compiling is needed, and execute those SON tools 206.

The SON automation engine 214 may also provide an API 208 for SON tools 206 such that SON tools 206 utilize the API 208 of the SON automation engine 214 rather than extending the API 208 with their own method/procedures. In such an embodiment, the API 208 may be relatively stable, with each of the consolidation engine 212, visualization tool 232, SON portal 234, engineering tools 236, reporting engine 238, parameter configurator 214, and SON automation engine 214 having their own method/procedure and performance indicators/parameters. Such a relatively stable API 208 may significantly reduce the burden on developers.

In further embodiments, the engineering tools 236 may participate with SON tools 206 in self-configuring, self-optimizing, or self-healing the SON telecommunication network 204. The engineering tools 236 may even be SON tools themselves, operating independently and without need of execution by the SON automation engine 214. As with other SON components, the engineering tools 236 may receive or retrieve data through, and provide output to, the API 208. Example engineering tools 236 may include at least one of a performance management tool, a RF planning tool, an automatic frequency planning tool, a rehoming tool, an automatic cell planning tool, or a geolocation tool. Each engineering tool 236 may provide output used by other engineering tools 236 or by SON tools 206.

The reporting engine 238 may participate with the SON tools 206 in generating reports. The reporting engine 238 may even be a SON tool itself, operating independently and without need of execution by the SON automation engine 214. As with other SON components, the reporting engine 238 may receive or retrieve data through, and provide output to, the API 208.

In some embodiments, while the SON automation engine 214, visualization tool 232, SON portal 234, engineering tools 236, and reporting engine are illustrated in FIG. 2 in connection with a SON telecommunication network 204, the SON automation engine 214, visualization tool 232, SON portal 234, engineering tools 236, and reporting engine 238 may also be associated with other types of SONs.

Example Environment Including Special Events Module

FIG. 3 illustrates a further example environment including a SON telecommunication network and a special events module, which may represent one or more SON tools, configured to receive indicia of events from the Internet or from historical usage patterns and to reconfigure telecommunication infrastructure of the SON telecommunication network based at least in part on information about the events. As illustrated, a special events module 302, which may be comprised by one or more SON tools, may receive indicia of events from the Internet 304. Sources of the indicia may include web feed sources 306, a web crawler 308, or one or more other event information sources 310. Based on information about the event, the special events module 302 may determine one or more configuration changes and may apply those changes to telecommunication infrastructure 312 of a SON 104. The special events module 302 may also notify an application server 314 of the configuration changes.

In various embodiments, the special events module 302 may comprise one or more SON tools, such as one or more of SON tools 106 or SON tools 206. While shown as a single module, the special events module 302 may be a plurality of modules associated with different capabilities of the special events module 302. For example, the special events module 302 could include a module for receiving indicia of events, a module for determining configuration changes, and a module for applying those changes. Also, while not illustrated, the special events module 302 may be executed by a SON automation engine, such as SON automation engine 214. The special events module 302 is executed on computing device 102, which, as mentioned above, may include other SON tools 106, an API for SONs 108, performance metrics 110, a consolidation engine 112, and a parameter configurator 114. Alternatively, the special events module 302 could instead be executed on a computing device 202.

In some embodiments, the special events module 302 receives indicia of events from one or more sources on the Internet 304. The special events module 302 may receive indicia of an event from a web feed source 306, such as a source of RSS feeds, from a web crawler 308, or from other event information sources 310. In addition to indicia of an event, the special events module 302 may receive information about the event, such as its location, time, and other information which may be relevant to understanding the impact of the event (e.g., number of attendees).

For example, the event could be a football game, and the special events module 302 may learn of the game through a National Football League™ (NFL™) event schedule RSS feed. The feed may specify the location of the game and the time that it is to be played. The special events module 302 could than receive or retrieve additional information about the game, such as attendance statistics for the home team, the capacity of the stadium etc. from Internet 304 sources. Additionally or alternatively, the special events module 302 could retrieve historical usage patterns from past football games played at that location. Such historical usage patterns could, for example, be retrieved from the performance indicators 110 or other sources, and the special events module 302 may use the API 108 to interact with the store of the performance indicators 110 or other source. Other example events could include baseball games, rock concerts, etc.

In some embodiments, the special events module 302 may alternatively or additionally receive alerts of historical usage patterns which are indicative of events or may scan data associated with historical usage patterns to detect events. Such historical usage patterns could, for example, be retrieved from the performance indicators 110 or other sources, and the special events module 302 may use the API 108 to interact with the store of the performance indicators 110 or other source.

After receiving the indicia, event information, historical usage patterns, etc. the special events module 302 may utilize that information to determine a location and a time for the event. If the indicia, event information, historical usage patterns, etc. does not include the information needed to determine the location and time for the event, the special events module 302 may search for that information on the Internet 304 or in historical records for the SON 104.

In various embodiments, the special events module 302 may then determine one or more configuration changes to apply to telecommunication infrastructure based on the information about the event. For example, if the event is a football game and forty thousand people will be attending, the special events module 302 may determine a configuration change to ensure the needed capacity. Some examples of configuration changes that may be determined responsive to different events include shutting down a cell site, turning on a cell site, adjusting power, adjusting a cell parameter (e.g., load balance threshold, maximum bit rate), adjusting a tilt of an antenna at a cell site, or reconfiguring handovers between connection types supported by a cell site.

In some embodiments, the special events module 302 may determine the configuration changes by applying one or more thresholds or models to the information about the event. The special events module 302 may then select one or more configuration changes based on associations of those configuration changes with the thresholds or models. For instance, different antenna tilts may be associated with different thresholds such that meeting a first threshold results in one tilt and meeting a further threshold results in additional tilt. Such thresholds or models may be included in policies of a telecommunication service provider associated with the SON 104.

Additionally or instead, the special events module 302 may determine the configuration changes by selecting a configuration change template from a plurality of configuration change templates based at least in part on information about the event. Different thresholds may have different criteria, and the special events module 302 may select the configuration change template that has criteria which best match the event information. For example, there may be a template specific to football games that has the type "football game" as its criterion. The special events module 302 determines a match by determining that the event information mentions that the event is a football game and selecting the template that has "football game" as its criterion.

In various embodiments, the special events module 302 may then apply the determined configuration changes to the telecommunication infrastructure 312 at the location and time of the event. Applying the changes at the location and time of the event may include, in some cases, applying the changes prior to the start time of the event and applying the changes to both the location and to the surrounding area. After the event, the special events module 302 may, in some embodiments, return the configuration of the telecommunication infrastructure 312 to its previous state. Further, in a number of embodiments, the special events module 302 may apply the configuration changes through the parameter configurator 114 and may interface with the parameter configurator 114 through the API for SONs 108.

In some embodiments, the telecommunication infrastructure 312 may comprise any component of a SON 104 which may be present at a specific location having an event and which may be involved in providing telecommunication services. For example, the telecommunication infrastructure 312 may include base station components, antennas, cellular towers, or other components associated with cell sites of the SON 104.

In various embodiments, the SON 104 may also include an application server 314. The application server 314 may provide policy updates to user devices, such as cellular phones, smart phones, tablet computers, etc. which may determine one or more behaviors of those user devices. For example, the application server 314 could transmit a policy to cause applications of user devices to connect to the SON 104 through telecommunication infrastructure less frequently (i.e., cause reduced polling frequency). In some embodiments, in addition to applying configuration changes to the telecommunication infrastructure 312, the special events module 302 informs the application server 314 of the changes, and the application server 314 send updated policies to the user devices which are at or predicted to be at the location having the telecommunication infrastructure 314 during the event.

Example Device

Figure 4:
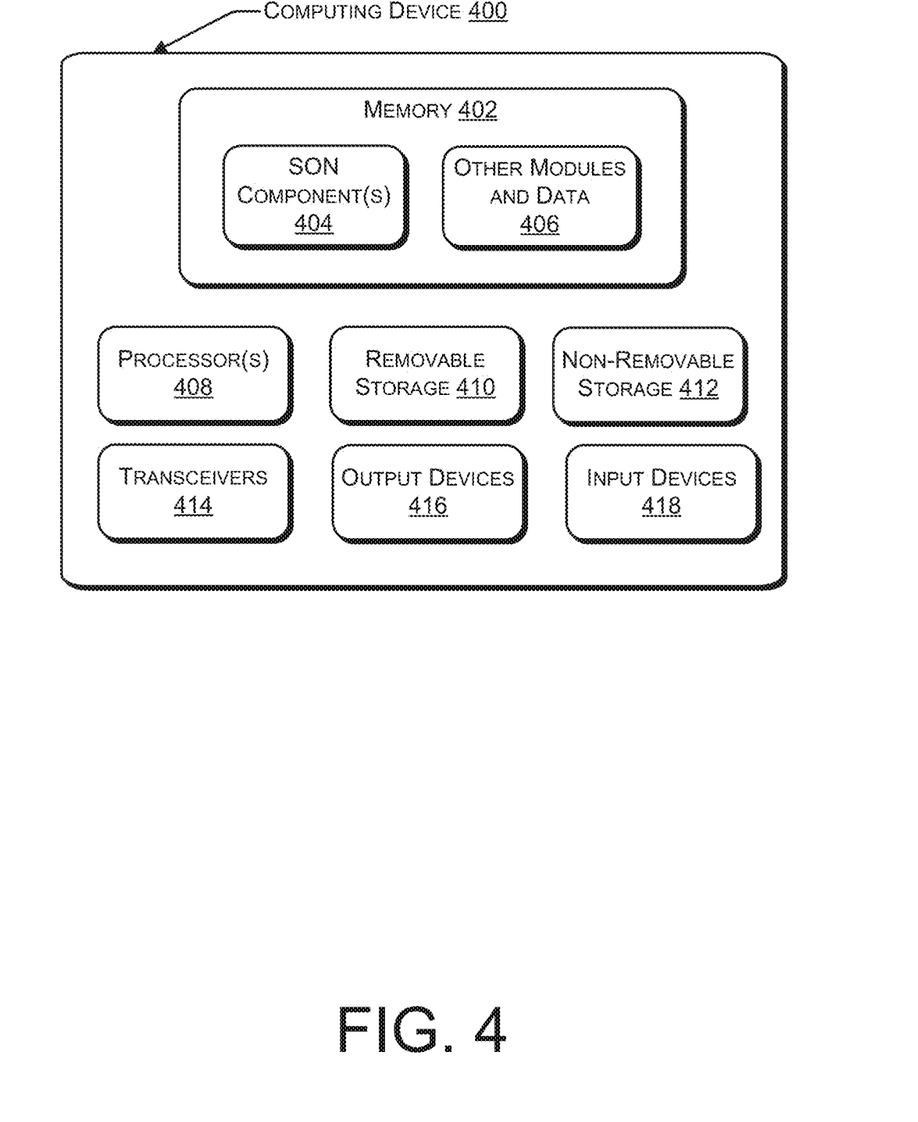
FIG. 4 illustrates a component level view of a computing device configured to implement one or more SON components.

FIG. 4 illustrates a component level view of a computing device configured to implement one or more SON components. As illustrated, the computing device 400 comprises a system memory 402 storing one or more SON components 404 and other modules and data 406. Also, the computing device 400 includes processor(s) 408, a removable storage 410, a non-removable storage 412, transceivers 414, output device(s) 416, and input device(s) 418.

In various embodiments, system memory 402 is volatile (such as RAM), non-volatile (such as ROM, flash memory, etc.) or some combination of the two. The SON component(s) 404 may be any one or more of the SON tools 106, the API 108, the performance indicator store 110, the consolidation engine 112, or the parameter configurator 114 described above in detail with regard to FIG. 1. The SON component(s) 404 may also or instead be any one or more of the SON tools 206, the API 208, the performance indicator store 210, the consolidation engine 212, the SON automation engine 214, the parameter configurator 216, the visualization tool 232, the SON portal 234, or the engineering tools 236 described above in detail with regard to FIG. 2. Further, the SON component(s) may also or instead be the special events module 302 described above in detail with regard to FIG. 3. The other modules or data 406 stored in the system memory 402 may comprise any sort of applications or platform components of the computing device 400, as well as data associated with such applications or platform components.

In some embodiments, the processor(s) 408 is a central processing unit (CPU), a graphics processing unit (GPU), or both CPU and GPU, or any other sort of processing unit.

The computing device 400 also includes additional data storage devices (removable and/or non-removable) such as, for example, magnetic disks, optical disks, or tape. Such additional storage is illustrated in FIG. 4 by removable storage 410 and non-removable storage 412. Tangible computer-readable media may include volatile and nonvolatile, removable and non-removable media implemented in any method or technology for storage of information, such as computer readable instructions, data structures, program modules, or other data. System memory 402, removable storage 410 and non-removable storage 412 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information and which can be accessed by the computing device 400. Any such tangible computer-readable media may be part of the computing device 400.

In some embodiments, the transceivers 414 include any sort of transceivers known in the art. For example, transceivers 414 may include a radio transceiver that performs the function of transmitting and receiving radio frequency communications via an antenna. The transceivers 414 may facilitate wireless connectivity between the computing device 400 and various nodes of the SON 104 or the SON telecommunication network 204. In addition, the transceivers 414 may also include a wireless communication transceiver and a near field antenna for communicating over unlicensed wireless IP networks, such as local wireless data networks and personal area networks (e.g., Bluetooth or near field communication (NFC) networks). Further, the transceivers 414 may include wired communication components, such as an Ethernet port, that connect the computing device 400 in a wired fashion to one or more nodes of the SON 104 or the SON telecommunication network 204.

In some embodiments, the output devices 416 include any sort of output devices known in the art, such as a display (e.g., a liquid crystal display), speakers, a vibrating mechanism, or a tactile feedback mechanism. Output devices 416 also include ports for one or more peripheral devices, such as headphones, peripheral speakers, or a peripheral display.

In various embodiments, input devices 418 include any sort of input devices known in the art. For example, input devices 418 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 5:
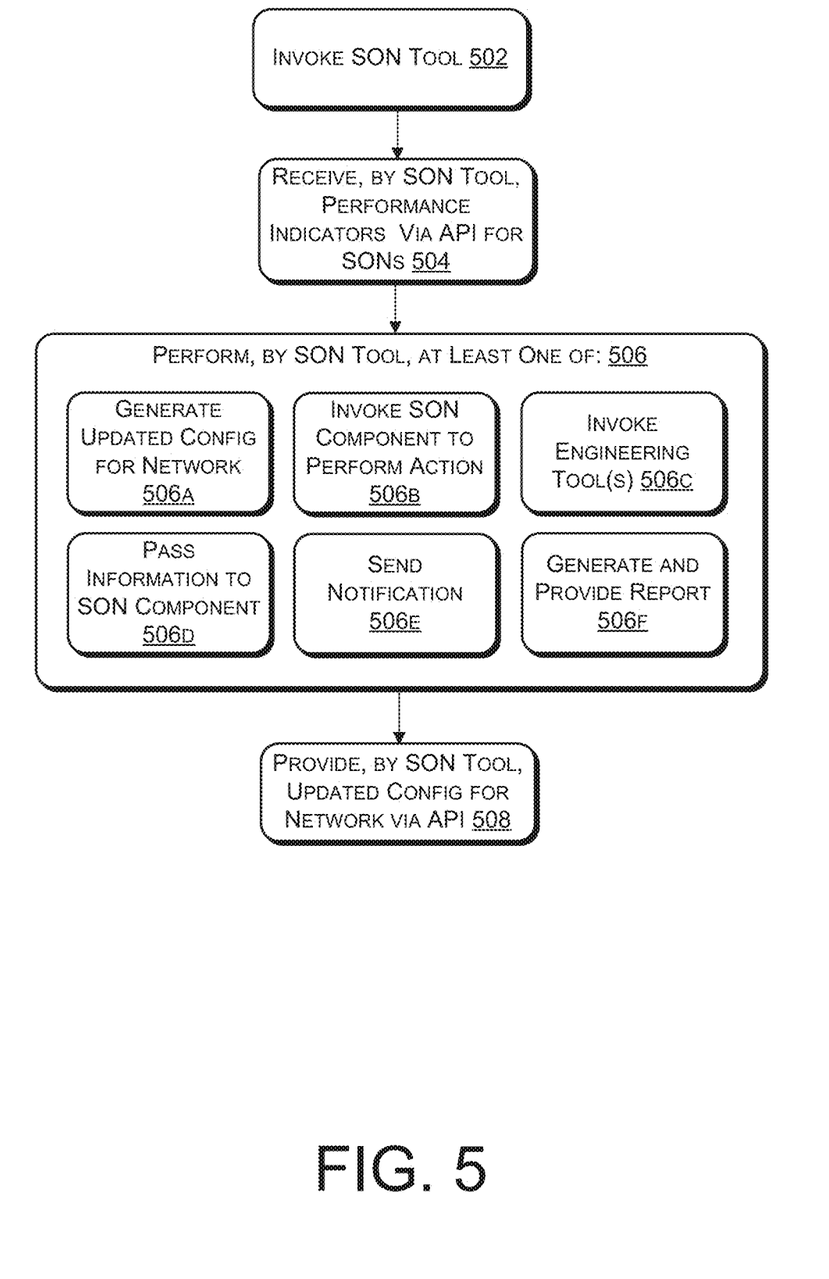
FIG. 5 illustrates an example process for receiving through an API for SONs, by a SON tool, performance indicators and performing at least one action based on the performance indicators.
Figure 6:
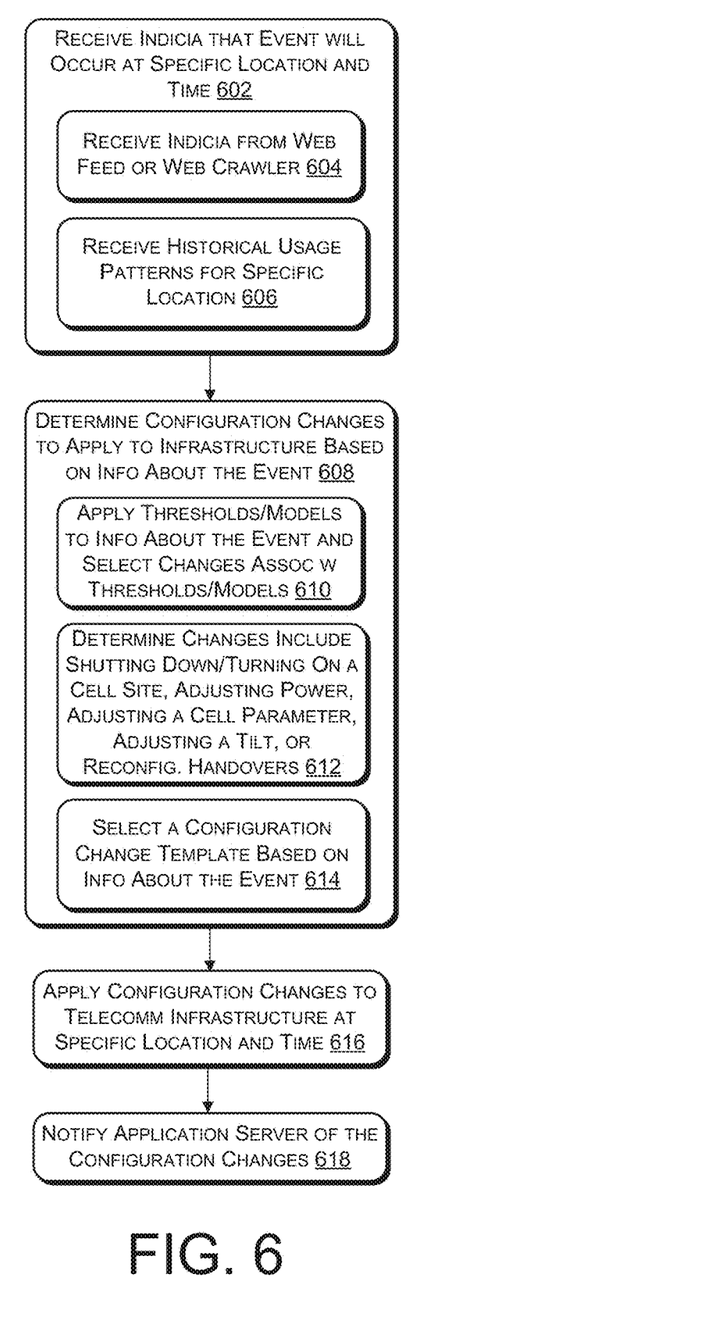
FIG. 6 illustrates an example process for receiving indicia of events from the Internet or from historical usage patterns and reconfiguring telecommunication infrastructure of the SON telecommunication network based at least in part on information about the events.

FIGS. 5 and 6 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process for receiving through an API for SONs, by a SON tool, performance indicators and performing at least one action based on the performance indicators. The process includes, at 502, the invoking of a SON tool by one or more of a visualization tool, another SON tool, a consolidation engine, or a SON portal. In other embodiments, rather than being invoked, the SON tool may be executed continuously or periodically.

At 504, the SON tool receives one more performance indicators associated with network information, the performance indicators received via an API for SONs that is utilized by a plurality of SON tools. The network information and the one or more network components are associated with one of a telecommunication network, a smart power grid, or a medical health system. In some embodiments, the API offers one or more alerts and alarms that may be received by or invoked by the SON tool.

At 506, the SON tool performs at least one action based at least in part on the one or more performance indicators, the at least one action being one of, at 506a, generating an updated network configuration, at 506b, invoking, via the API, a SON component to perform an action, at 506c, invoking, via the API, an engineering tool to perform an action, at 506d, passing, via the API, information to a SON component, at 506e, sending, via the API, a notification, or at 506f, generating a report.

At 508, the SON tool provides the updated network configuration via the API to configure one or more network components. In some embodiments, the updated network configuration comprises an update to at least one of the one or more performance indicators.

FIG. 6 illustrates an example process for receiving indicia of events from the Internet or from historical usage patterns and reconfiguring telecommunication infrastructure of the SON telecommunication network based at least in part on information about the events. The example process includes, at 602, receiving, by a computing device implementing one or more SON tools, receive indicia that an event affecting usage of telecommunication service will occur at a specific location and a specific time. The one or more SON tools may comprise, for example, a special events module. At 604, receiving the indicia may also or instead comprise receiving the indicia from one or more web feeds or from a web crawler. At 606, receiving the indicia may comprise receiving or retrieving historical usage patterns associated with the specific location.

At 608, the computing device implementing the one or more SON tools determines, based at least in part on information about the event, one or more configuration changes to apply to telecommunication infrastructure. In some embodiments, when the indicia comprise historical usage patterns, the information about the event may be the same as the indicia; that is, the information about the event may also comprise the historical usage patterns. At 610, the determining may comprise applying one or more thresholds or models to the information about the event and selecting one or more configuration changes based on associations of those configuration changes with the thresholds or models. At 612, the determining may also or instead comprise determining as the one or more configuration changes include at least one of shutting down a cell site, turning on a cell site, adjusting power, adjusting a cell parameter (e.g., load balance threshold, maximum bit rate), adjusting a tilt of an antenna at a cell site, or reconfiguring handovers between connection types supported by a cell site. At 614, the determining may further or instead include selecting a configuration change template from a plurality of configuration change templates based at least in part on information about the event.

At 616, the computing device implementing the one or more SON tools then applies the one or more configuration changes to the telecommunication infrastructure at the specific location and at the specific time.

At 618, the computing device implementing the one or more SON tools may then notify an application server of the configuration changes to the telecommunication infrastructure to enable the application server to manage user devices within a wireless connection range of the telecommunication infrastructure.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. A computer-implemented method comprising:
    receiving, by one or more self-organizing network (SON) tools executing via a SON automation engine on one or more computing devices remote from cell site infrastructure of a telecommunication network, indicia from one or more web feeds or from a web crawler about a real-world event scheduled in the future, the indicia including information about the real-world event indicating that the real-world event will occur at a specific location and a specific time;
    determining, by the one or more SON tools, an expected number of attendees of the real-world event based on at least one of expected attendance information included in the indicia or historical information about similar real-world events held in the past at the specific location;
    determining, by the one or more SON tools, an expected impact of the real-world event on usage of the cell site infrastructure due to an expected presence of the expected number of attendees at the specific location at the specific time;
    determining, by the one or more SON tools, one or more configuration changes for the cell site infrastructure that will adjust capacity of the cell site infrastructure for connections to user devices at the specific location and the specific time based on the expected number of attendees;
    applying, by the one or more SON tools via an application programming interface (API) exposed to the one or more SON tools by the SON automation engine, the one or more configuration changes to the cell site infrastructure at the specific location and at the specific time; and
    sending, by the one or more SON tools via the API to an application server of the telecommunication network that is separate and distinct from the cell site infrastructure and is separate and distinct from the one or more computing devices, a notification of the one or more configuration changes to the cell site infrastructure, to enable the application server to manage the behavior of the user devices within a wireless connection range of the cell site infrastructure by providing policy updates to the user devices that change how the user devices connect to the cell site infrastructure based on the one or more configuration changes to the cell site infrastructure,
wherein the one or more configuration changes to the cell site infrastructure include at least one of shutting down a cell site, turning on a cell site, adjusting power, adjusting a load balance threshold, adjusting a maximum bit rate, adjusting a tilt of an antenna at a cell site, or reconfiguring handovers between connection types supported by a cell site.

2. The computer-implemented method of claim 1, further comprising receiving historical usage patterns associated with the specific location.

3. The computer-implemented method of claim 1, wherein determining the one or more configuration changes comprises applying one or more thresholds or models to the information about the real-world event and selecting the one or more configuration changes based on associations of those one or more configuration changes with the one or more thresholds or models.

4. The computer-implemented method of claim 1, wherein determining the one or more configuration changes comprises selecting a configuration change template from a plurality of configuration change templates based on a type of the real-world event and/or the information associated with the real-world event.

5. One or more non-transitory computer-readable media having stored thereon a plurality of computer-executable instructions configured to cause one or more self-organizing network (SON) tools executing via a SON automation engine on one or more computing devices remote from cell site infrastructure of a telecommunication network to perform operations comprising:
receiving indicia from one or more web feeds or from a web crawler about a real-world event scheduled in the future, the indicia including information about the real-world event indicating that the real-world event will occur at a specific location and a specific time;
determining an expected number of attendees of the real-world event based on at least one of expected attendance information included in the indicia or historical information about similar real-world events held in the past at the specific location;
determining an expected impact of the real-world event on usage of the cell site infrastructure due to an expected presence of the expected number of attendees at the specific location at the specific time;
determining one or more configuration changes for the cell site infrastructure that will adjust capacity of the cell site infrastructure for connections to user devices at the specific location and the specific time based on the expected number of attendees;
applying, via an application programming interface (API) exposed to the one or more SON tools by the SON automation engine, the one or more configuration changes to the cell site infrastructure at the specific location and at the specific time; and
sending, via the API to an application server of the telecommunication network that is separate and distinct from the cell site infrastructure and is separate and distinct from the one or more computing devices, a notification of the one or more configuration changes to the cell site infrastructure to enable the application server to manage the behavior of the user devices within a wireless connection range of the cell site infrastructure by providing policy updates to the user devices that change how the user devices connect to the cell site infrastructure based on the one or more configuration changes to the cell site infrastructure,
wherein the one or more configuration changes to the cell site infrastructure include at least one of shutting down a cell site, turning on a cell site, adjusting power, adjusting a load balance threshold, adjusting a maximum bit rate, adjusting a tilt of an antenna at a cell site, or reconfiguring handovers between connection types supported by a cell site.

6. The one or more non-transitory computer-readable media of claim 5, wherein the operations further comprise receiving historical usage patterns associated with the specific location.

7. The one or more non-transitory computer-readable media of claim 5, wherein determining the one or more configuration changes comprises applying one or more thresholds or models to the information about the real-world event and selecting the one or more configuration changes based on associations of those one or more configuration changes with the one or more thresholds or models.

8. The one or more non-transitory computer-readable media of claim 5, wherein determining the one or more configuration changes comprises selecting a configuration change template from a plurality of configuration change templates based on a type of the real-world event and/or the information about the real-world event.

9. A system comprising:
one or more processors; and
a self organizing network (SON) automation engine configured to be operated by the one or more processors remotely from cell site infrastructure of a telecommunication network to execute one or more SON tools to perform operations including:
receiving indicia from one or more web feeds or from a web crawler about a real-world event scheduled in the future, the indicia including information about the real-world event indicating that the real-world event will occur at a specific location and a specific time;
determining an expected number of attendees of the real-world event based on at least one of expected attendance information included in the indicia or historical information about similar real-world events held in the past at the specific location;
determining an expected impact of the real-world event on the cell site infrastructure due to an expected presence of the expected number of attendees at the specific location at the specific time;
determining one or more configuration changes for the cell site infrastructure that will adjust capacity of the cell site infrastructure for connections to user devices at the specific location and the specific time based on the expected number of attendees;
applying, via an application programming interface (API) exposed to the one or more SON tools by the SON automation engine, the one or more configuration changes to the cell site infrastructure at the specific location and at the specific time; and
sending, to an application server that is separate and distinct from the cell site infrastructure and is separate and distinct from the system, a notification of the configuration changes to the cell site infrastructure to enable the application server to manage the behavior of the user devices within a wireless connection range of the cell site infrastructure by providing policy updates to the user devices that change how the user devices connect to the cell site infrastructure based on the one or more configuration changes to the cell site infrastructure, wherein the one or more configuration changes to the cell site infrastructure include at least one of shutting down a cell site, turning on a cell site, adjusting power, adjusting a load balance threshold, adjusting a maximum bit rate, adjusting a tilt of an antenna at a cell site, or reconfiguring handovers between connection types supported by a cell site.

10. The system of claim 9, wherein the operations further comprise receiving historical usage patterns associated with the specific location.

11. The system of claim 9, wherein determining the one or more configuration changes comprises applying one or more thresholds or models to the information about the real-world event and selecting the one or more configuration changes based on associations of those one or more configuration changes with the one or more thresholds or models.

12. The system of claim 9, wherein determining the one or more configuration changes comprises selecting a configuration change template from a plurality of configuration change templates based on a type of the real-world event and/or the information about the real-world event.

13. The computer-implemented method of claim 3, wherein the one or more configuration changes includes adjusting the tilt of the antenna of the cell site, and wherein the tilt is adjusted to a first tilt when the information about the real-world event meets a first threshold of the one or more thresholds or models and is adjusted to a second tilt when the information about the real-world event meets a second threshold of the one or more thresholds or models.

14. The one or more non-transitory computer-readable media of claim 7, wherein the one or more configuration changes includes adjusting the tilt of the antenna of the cell site, and wherein the tilt is adjusted to a first tilt when the information about the real-world event meets a first threshold of the one or more thresholds or models and is adjusted to a second tilt when the information about the real-world event meets a second threshold of the one or more thresholds or models.

15. The system of claim 11, wherein the one or more configuration changes includes adjusting the tilt of the antenna of the cell site, wherein the tilt is adjusted to a first tilt when the information about the real-world event meets a first threshold of the one or more thresholds or models and is adjusted to a second tilt when the information about the real-world event meets a second threshold of the one or more thresholds or models.

\* \* \* \* \*